US011432642B2

(12) United States Patent
Ross

(10) Patent No.: US 11,432,642 B2
(45) Date of Patent: Sep. 6, 2022

(54) HARNESS FOR CLIP

(71) Applicant: First-Light USA, LLC, Seymour, IL (US)

(72) Inventor: Jeremy B. Ross, Monticello, IL (US)

(73) Assignee: First-Light USA, LLC, Seymour, IL (US)

( * ) Notice: Subject to any disclaimer, the term of this patent is extended or adjusted under 35 U.S.C. 154(b) by 120 days.

(21) Appl. No.: 16/947,468

(22) Filed: Aug. 3, 2020

(65) Prior Publication Data

US 2022/0031051 A1  Feb. 3, 2022

(51) Int. Cl.
*A45F 5/02* (2006.01)
*F16B 1/00* (2006.01)
*F16B 11/00* (2006.01)
*F16B 2/22* (2006.01)
*B60R 11/00* (2006.01)
*A41D 13/00* (2006.01)
*A01K 27/00* (2006.01)
*A45F 3/04* (2006.01)

(52) U.S. Cl.
CPC .............. *A45F 5/02* (2013.01); *A01K 27/008* (2013.01); *A41D 13/0007* (2013.01); *B60R 11/00* (2013.01); *F16B 1/00* (2013.01); *F16B 2/22* (2013.01); *F16B 11/006* (2013.01); *A45F 3/04* (2013.01); *B60R 2011/0003* (2013.01); *B60R 2011/0063* (2013.01); *B60R 2011/0071* (2013.01); *F16B 2001/0028* (2013.01)

(58) Field of Classification Search
CPC . Y10T 24/13; Y10T 24/1388; Y10T 24/1397; Y10T 2424/2708; Y10T 2424/33; Y10T 24/2708; Y10T 24/33; F16B 11/006; A45F 5/02; B60R 2011/0063
See application file for complete search history.

(56) References Cited

U.S. PATENT DOCUMENTS

| | | | | |
|---|---|---|---|---|
| 5,470,000 A * | 11/1995 | Munoz | ...................... | A45F 5/02 2/300 |
| 5,724,707 A * | 3/1998 | Kirk | .................... | A41D 13/0012 24/3.7 |
| 8,002,159 B2 * | 8/2011 | Cragg | ....................... | A45F 5/02 224/579 |
| 8,523,029 B2 * | 9/2013 | Rogers | ...................... | A45F 5/02 224/182 |
| 9,055,773 B2 * | 6/2015 | Crye | ......................... | A45F 5/02 |
| 2011/0191933 A1 * | 8/2011 | Gregory | ............. | A41D 13/0012 2/69 |

* cited by examiner

*Primary Examiner* — Robert Sandy
(74) *Attorney, Agent, or Firm* — Ascenda Law Group, PC

(57) ABSTRACT

A harness system for a clip. The clip has a base portion and a pair of elongated members, the elongated members folded over the base portion, thereby defining a gap configured to receive portions of a harness. The elongated members are separated from one another by a longitudinal opening for accommodating a rib between the portions of the harness. A gate is securably engaged to a first one of the elongated members and rotatable between an open position in which the gate does not obstruct said longitudinal opening and a closed position in which said gate obstructs said longitudinal opening. The harness is fashioned from a strip of webbing secured to a base along its midline and edges. The webbing thereby forms two pockets, each sized to accommodate one of the elongated members of the clip.

12 Claims, 5 Drawing Sheets

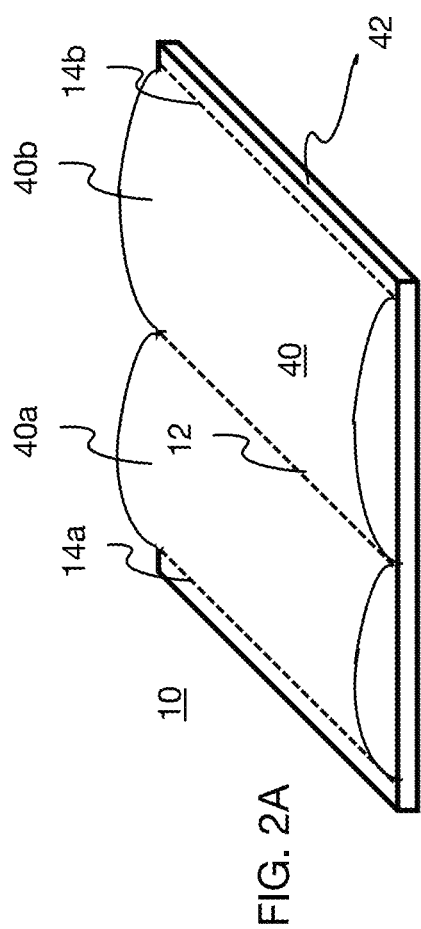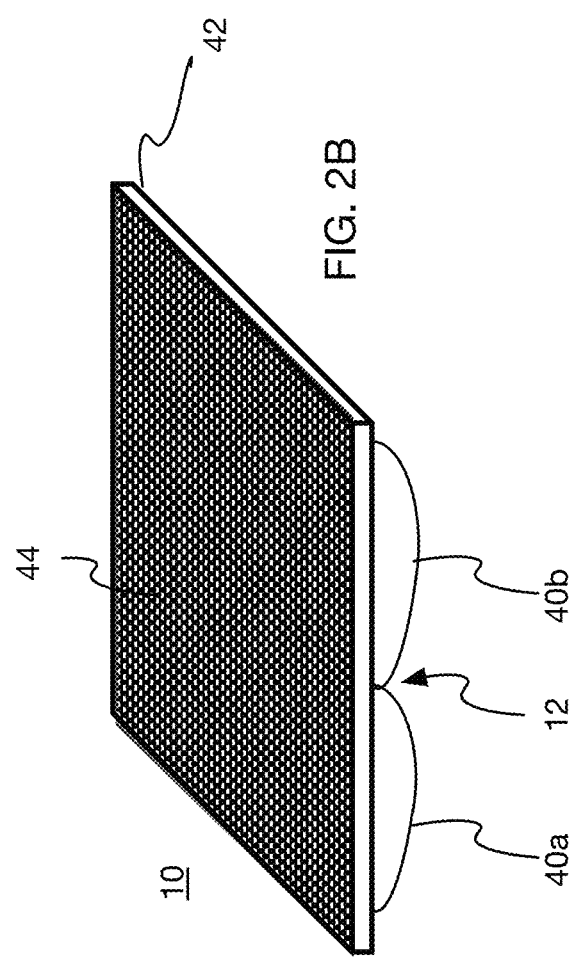

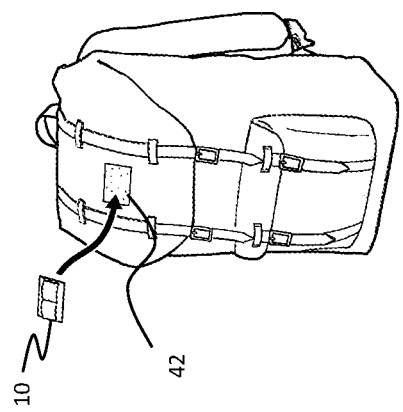
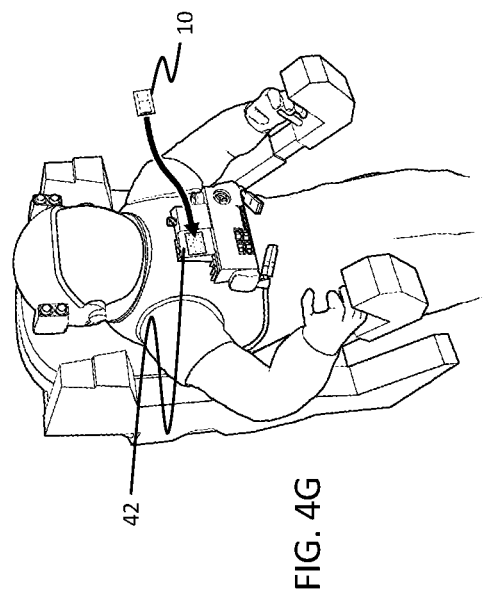
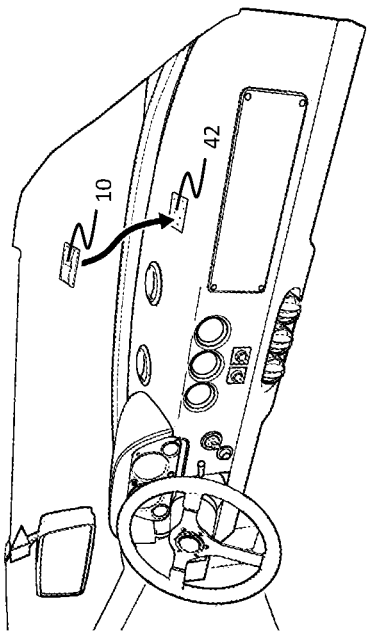

HARNESS FOR CLIP

STATEMENT REGARDING FEDERALLY SPONSORED RESEARCH OR DEVELOPMENT

This invention was made with government support under FA875119CA058 awarded by the Air Force Research Laboratory (DOD-USAF-AFMC). The government has certain rights in the invention.

FIELD OF THE INVENTION

The present invention relates generally to a harness for a clip.

BACKGROUND

So-called Modular Lightweight Load-carrying Equipment, or MOLLE, uses a Pouch Attachment Ladder System (PALS) of webbing (heavy duty nylon straps) to allow for the removable attachment of various objects to a garment, e.g., as described in U.S. Pat. No. 5,724,707. MOLLE systems allow users to customize their equipment loads according to mission requirements. Typically, equipment is secured to a vest or other tactical garment using straps that fit between the PALS webbing and self-secure using snaps or hook-and-loop (e.g., VELCRO®) fasteners.

SUMMARY OF THE INVENTION

In one embodiment of the invention, a clip has a base portion and a pair of elongated members, where the elongated members are folded under the base portion, thereby defining a gap configured to receive portions of a webbing. The elongated members are separated from one another by a longitudinal opening for accommodating sewing ribs between the portions of the webbing, and a gate is securably engaged to a first one of the elongated members and rotatable between an open position in which the gate does not obstruct the longitudinal opening and a closed position in which the gate obstructs said longitudinal opening. In one embodiment, the gate is a locking wire. When in its closed position, the locking wire removably engages a second one of the elongated members, for example by removably engaging the second one of the elongated members at a recess in a longitudinal outside edge of the second one of the elongated members. When in its open position, the locking wire removably engages the first one of the elongated members at a recess in a longitudinal outside edge of the first one of the elongated members. Thus, each respective one of the elongated members may include a recess in a longitudinal outside edge of the respective elongated member for removably engaging the locking wire.

Another embodiment of the invention provides a harness for a clip. The harness is fashioned from a strip of webbing secured (e.g., by stitching) to a base along its midline and edges, thereby forming two pockets, each pocket defined by the webbing on one side and by the base on another side. On a side of the base opposite the webbing may be secured one part of a hook-and-loop fastener system or an adhesive backing.

Another embodiment of the invention provides a clip and harness system that includes a clip having a base portion and a pair of elongated members, the elongated members folded over the base portion, thereby defining a gap configured to receive portions of a harness. The elongated members are separated from one another by a longitudinal opening for accommodating a rib between the portions of the harness. A gate is securably engaged to a first one of the elongated members and rotatable between an open position in which the gate does not obstruct said longitudinal opening and a closed position in which said gate obstructs said longitudinal opening. The harness is fashioned from a strip of webbing secured (e.g., by stitching) to a base along a midline and edges of the webbing, the webbing thereby forming two pockets, each pocket defined by the webbing on one side and by the base on another side and sized to accommodate one of the elongated members of the clip. The gate may be is a locking wire. When in its closed position the locking wire may removably engage one of the elongated members at a recess in a longitudinal outside edge of that elongated member. When in its open position the locking wire may removably engage the other the elongated members at a recess in a longitudinal outside edge of that other elongated member. The clip and harness system may further include a receiving plate that includes engages the base of the harness with a hook-and-loop fastener system. The receiving plate may be secured to a strap, a helmet, a tactical vest, a wall, a pet's collar, a vehicle interior, a backpack, an environmental suit, or other item.

These and further embodiments of the present invention are discussed in more detail below.

BRIEF DESCRIPTION OF THE DRAWINGS

The present invention is illustrated by way of example, and not limitation, in the figures of the accompanying drawings, in which:

FIGS. 1A-1C illustrate a clip configured in accordance with embodiments of the present invention, wherein FIG. 1A is a top perspective view of the clip, FIG. 1 B is a bottom perspective view of the clip, and FIG. 1C is a bottom view of the clip.

FIGS. 2A and 2B illustrate a harness for the clip shown in FIGS. 1A-1C, wherein FIG. 2A is a top perspective view of the harness, and FIG. 2B is a bottom perspective view of the harness.

FIGS. 4A-4G show further examples of locations where the receiving plate can be located.

DESCRIPTION

Described herein are examples of a clip and a harness for the clip. The clip includes a longitudinal opening for accommodating sewing ribs between portions of a webbing which serves as the harness and a gate (which in one embodiment is a locking wire) rotatable between an open position and a closed position at one end of said longitudinal opening.

Figure 1C:
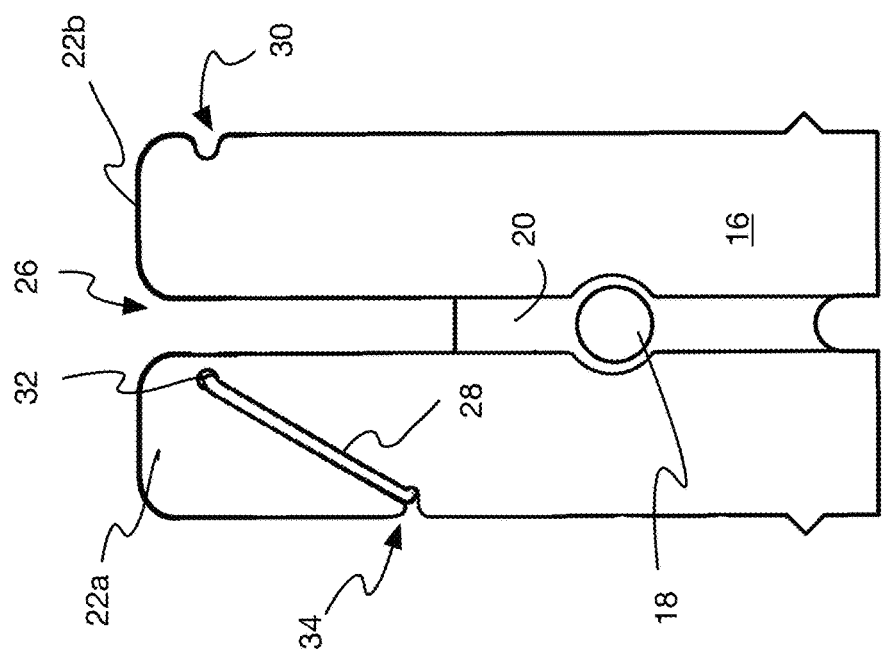
Figure 1A:
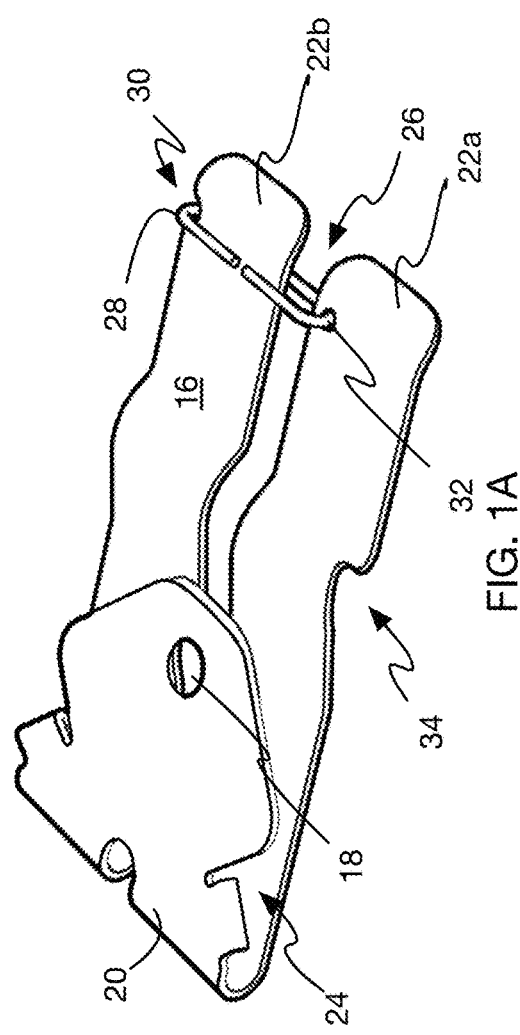
Figure 1B:
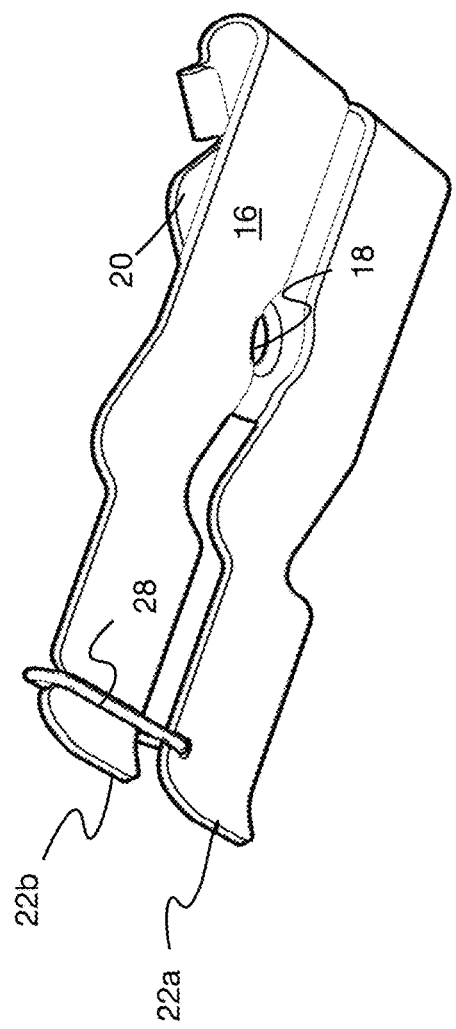

Referring now to FIGS. 1A-1C in which like components are designated with like reference numbers, an example of a clip 16 is shown. In the illustrated example, the clip 16 may be secured (e.g., by way of a pin) to an article through a hole 18 in a base portion 20. When so secured to an article, the clip 16 is rotatable in a plane about an axis defined by (in this example orthogonal to) the pin through hole 18. Alternatively, the clip may be fitted to an article with a cylindrical post or pin, which post may turn freely or in a ratchet fashion, with respect to a receiving support structure. A ratchet joint would allow the azimuthal direction of the clip with respect to the article to be set without fear that it will easily deviate therefrom. The same may be accomplished using a snuggly fitting friction joint, for example as provided by overlapping, hollow cylindrical posts associated with the clip and article that are prevented from coming apart by flanges on their ends. The rotating attachment of the clip is optional but advantageous in certain applications of the device.

In addition to base portion 20, the clip 16 has a pair of elongated members 22a, 22b, where the elongated members are folded underneath the base portion, thereby defining a gap 24 between the base portion 20 and the elongated members 22a, 22b folded thereunder. The gap 24 is configured to receive webbing portions of the harness or other article (e.g., a strap, a bill of a cap, a collar, cuff, or front placket of a shirt, an edge of a table, pedestal, or other surface, a bracket on a wall, ceiling, cockpit, or other surface, a belt, suspenders, or other article of clothing, or generally any convenient item which is stationary relative to the frame and of a size that can be accommodated in gap 24). The elongated members 22a, 22b are separated from one another by a longitudinal opening 26 (at least along a portion of their length) for accommodating sewing ribs between the webbing portions of the webbing harness or other article, and a gate 28 is securably engaged to a first one of the elongated members 22a, 22b and is rotatable between an open position (see, e.g., FIG. 1C) in which the gate does not obstruct the longitudinal opening 26 and a closed position (see, e.g., FIGS. 1A and 1B) in which the gate obstructs the longitudinal opening.

In the illustrations, the gate 28 is a locking wire. When in its closed position, the locking wire, which is secured to elongated member 22a by passing through a hole 32 therein, removably engages elongated member 22b to obstruct the longitudinal opening 26, for example by removably engaging elongated member 22b at a recess 30 in a longitudinal outside edge of elongated member 22b. When in its open position, the locking wire 28 removably engages elongated member 22a at a recess 34 in a longitudinal outside edge of elongated member 22a. Thus, in addition to one of the elongated members securing at least one end of the locking wire, each respective one of the elongated members 22a, 22b may include a recess in a respective longitudinal outside edge thereof for removably engaging the locking wire. In other embodiments of the invention, the gate 28 may be a member that swings closed and open (e.g., about a pin securing it to one of the elongated members of the clip), obstructing the longitudinal opening 26 when in its closed position and not obstructing the longitudinal opening 26 when in its open position, or a cap that can be fitted cover the two ends of the elongated members 22a, 22b and obstruct the longitudinal opening 26 when it is in place. The cap may be securably attached to the clip 16 (or not) when it is not in use. Alternatively, the gate 28 may be a barrel bolt latch or a chain latch which obstructs the longitudinal opening 26 when in its closed position and does not obstruct the longitudinal opening 26 when in its open position.

Clip 16 is preferably made of metal or other durable material and is molded in the shape of an elongated "U", with a gap 24 between its base portion 20 and the elongated members 22a, 22b to receive a webbing, strap, bill of a cap, or other attachment means. Fabrication processes for the clip include, but are not limited to, injection molding, sintering, milling, and die cutting. Alternatively, or in addition, one or more additive manufacturing processes, such as extrusion, vat photopolymerization, powder bed fusion, material jetting, or direct energy jetting, may be used to fashion the clip.

Devices configured in accordance with embodiments of the present invention are suitable for application in a variety of contexts, including military, law enforcement, consumer recreational, and others. Devices configured in accordance with embodiments of the present invention can be worn with or without a helmet, hat, or other headdress, and can also be attached to straps worn on a user's head, hand, or elsewhere, and can also be attached to nylon or other strap-like webbing. Such devices may also be secured to any convenient protruding edge of furniture or other articles.

Referring now to FIGS. 2A and 2B, an example of a harness 10 for the clip 16 is shown. The harness 10 is fashioned from a strip of nylon webbing 40 sewn or otherwise secured to a rigid base 42 along its midline 12 and edges 14A and 14b. On the side of the rigid base 42 opposite the webbing 40 is secured one part of a hook-and-loop fastener system 44. Thus, the harness 10 may be attached to any surface or item by engaging the portion of the hook-and-loop fastener system 44 on base 42 with a complementary portion of the hook-and-loop fastener system associated with the surface to which the harness is being attached. Alternatively, for a more permanent or semi-permanent mount, the side of the rigid base 42 opposite the webbing 40 may have an adhesive backing for application to a surface.

Because the webbing 40 is sewn or otherwise secured to a rigid base 42 along its midline 12 and edges 14A and 14b, two pockets of webbing 40a, 40b are formed. Pockets 40a and 40b are defined by the nylon webbing on one hemispherical (or approximately so) side and by the rigid base 42 on the other. The pockets 40a, 40b are sized to accommodate the elongated members 22a, 22b of clip 16, with the sewn midline 12 passing through the longitudinal opening 26 between the elongated members 22a, 22b. When so inserted in the pockets 40a, 40b, the elongated members 22a, 22b of clip 16 may be secured therein by positioning gate 28 in its closed position, thereby preventing the elongated members 22a, 22b from being removed from the pockets 40a, 40b of harness 10.

Figure 3:
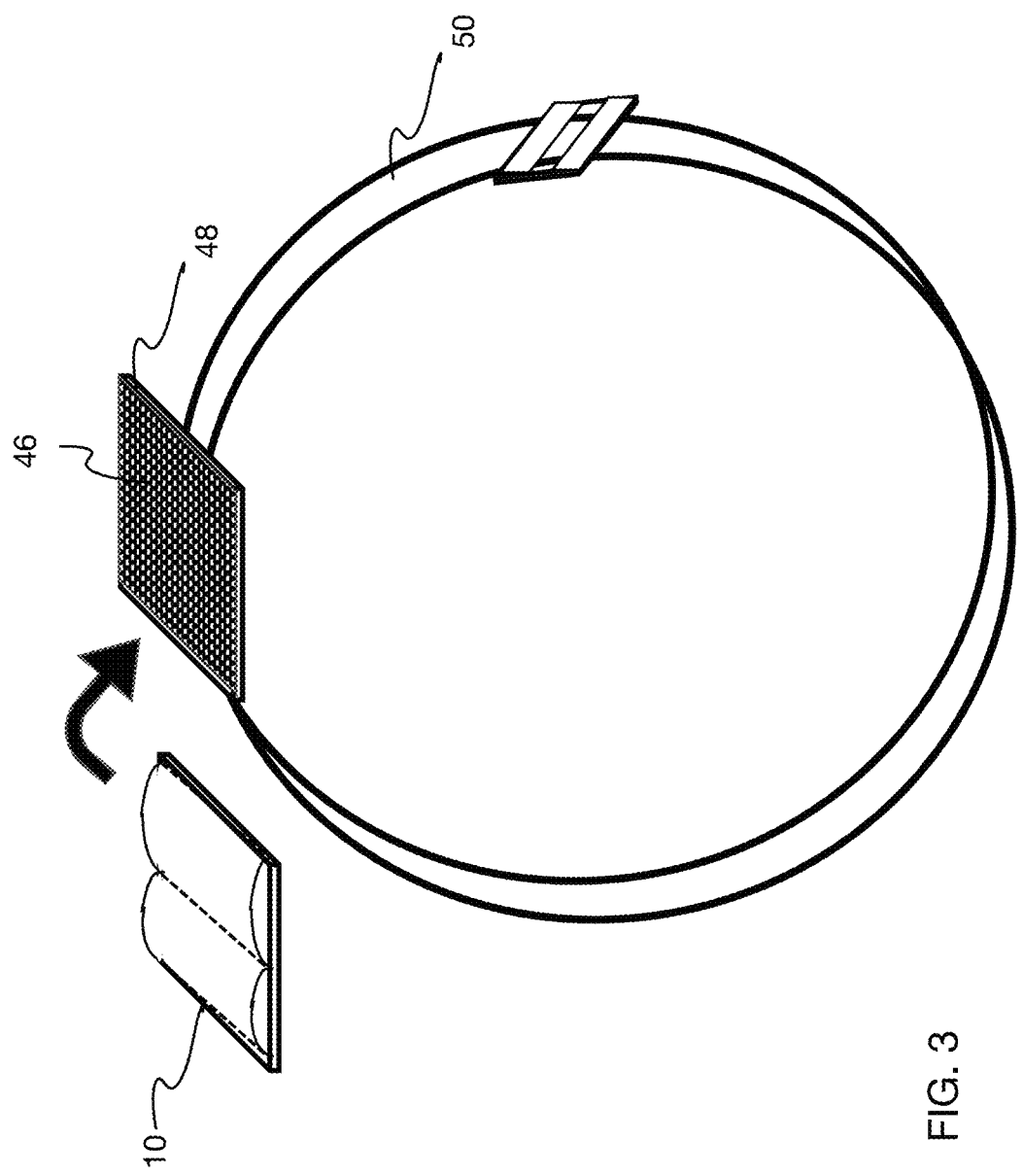
FIG. 3 shows an example of the harness of FIGS. 2A and 2B secured to a receiving plate that is mounted on a strap.
Figure 4A:
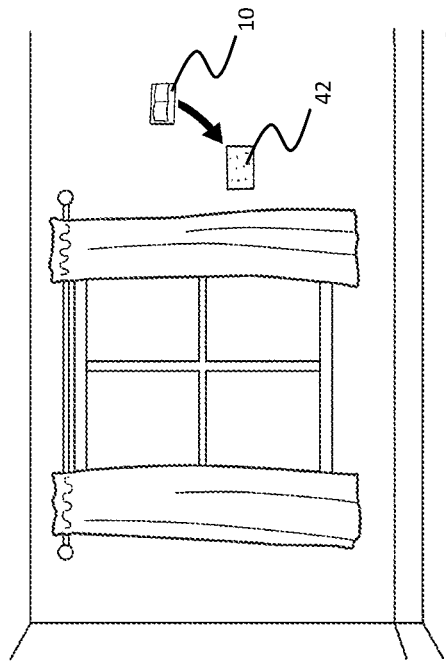
Figure 4C:
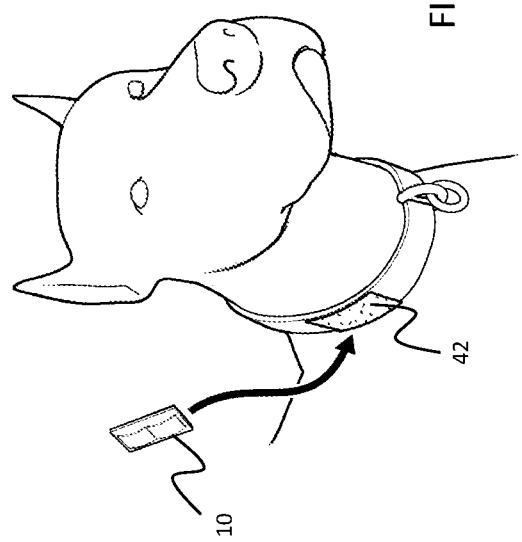
Figure 4B:
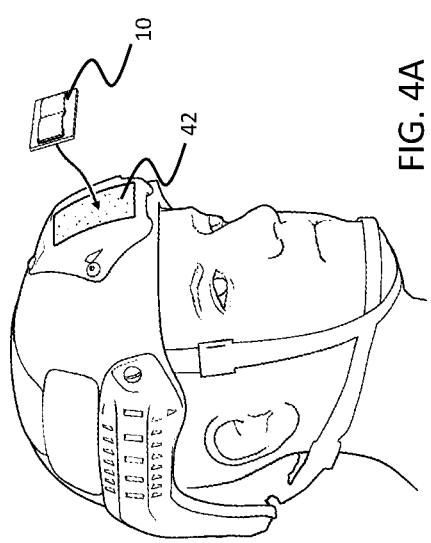
Figure 4D:
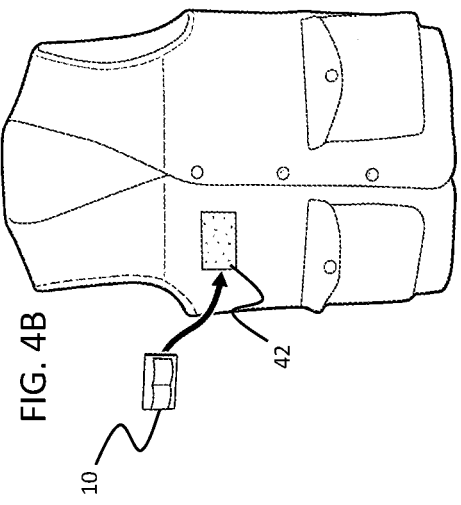

FIG. 3 shows an example of harness 10 being secured to a receiving plate 48 that is mounted on a strap 50. Receiving plate 48 includes a complementary portion 46 of the hook-and-loop fastener system to which harness 10 can be secured. The strap 50 may be worn by a user on his/her head, hand, arm, etc., and thereby used as a means to secure a module that includes the clip 16. Other examples of locations where the receiving plate can be located include a helmet (FIG. 4A), a tactical vest (FIG. 4B), a wall (FIG. 4C), a pet's collar (FIG. 4D), a vehicle interior (FIG. 4E), a backpack (FIG. 4F), and an environmental suit (FIG. 4G). Other locations are also possible.

Thus, a harness for a clip has been described.

What is claimed is:

1. A harness for a clip comprising a strip of webbing secured to a base along a midline and edges of the webbing, the webbing thereby forming two pockets, each pocket defined by the webbing on one side and by the base on another side, wherein on a side of the base opposite the webbing is secured one part of a hook-and-loop fastener system.

2. The harness of claim 1, wherein the webbing is secured to the base along the midline and edges of the webbing by stitching.

3. The harness of claim 1, wherein the pockets are each adapted to receive an elongated member of a base portion of a clip, and the midline is sized to be accommodated within a longitudinal opening between the elongated members.

4. A harness system, comprising a strip of webbing secured to a base along a midline and edges of the webbing, the webbing thereby forming two pockets on a first side of the base, each pocket defined by the webbing on one side and by the first side of the base on another side and sized to accommodate one of a pair of elongated members of a clip, the base having a second side opposite the webbing including one part of a hook-and-loop fastener system.

5. The harness system of claim 4, wherein the webbing is secured to the base along the midline and edges of the webbing by stitching.

6. The harness system of claim 5, further including a receiving plate that includes a complementary portion of the hook-and-loop fastener system.

7. The harness system of claim 6, wherein the receiving plate is secured to a strap.

8. The harness system of claim 6, wherein the receiving plate is secured to a helmet.

9. The harness system of claim 6, wherein the receiving plate is secured to one of: a tactical vest, a wall, a pet's collar, a vehicle interior, a backpack and an environmental suit.

10. A harness for a clip comprising a strip of webbing secured to a base along a midline and edges of the webbing, the webbing thereby forming two pockets, each pocket defined by the webbing on one side and by the base on another side, wherein on a side of the base opposite the webbing is an adhesive backing.

11. The harness of claim 10, wherein the webbing is secured to the base along the midline and edges of the webbing by stitching.

12. The harness of claim 10, wherein the pockets are each adapted to receive an elongated member of a base portion of a clip, and the midline is sized to be accommodated within a longitudinal opening between the elongated members.

\* \* \* \* \*